United States Patent

Mees et al.

[11] Patent Number: 6,117,312
[45] Date of Patent: Sep. 12, 2000

[54] FILTER BYPASS VALVE HAVING ADJUSTABLE SPRING BIASING FORCE

[75] Inventors: Harald Mees, Lebach; Michael Sakraschinsky, St. Ingbert, both of Germany

[73] Assignee: Hydac Filtertechnik GmbH, Sulzbach, Germany

[21] Appl. No.: 09/091,095

[22] PCT Filed: Oct. 19, 1996

[86] PCT No.: PCT/EP96/04555

§ 371 Date: Jun. 12, 1998

§ 102(e) Date: Jun. 12, 1998

[87] PCT Pub. No.: WO97/21481

PCT Pub. Date: Jun. 19, 1997

[30] Foreign Application Priority Data

Dec. 13, 1995 [DE] Germany .......................... 195 46 440

[51] Int. Cl.[7] ................................. B01D 27/10
[52] U.S. Cl. ........................ 210/130; 210/429; 210/430; 137/543.13; 137/543.19
[58] Field of Search ................................... 210/130, 132, 210/133, 430, 429; 137/549, 550, 543.21, 543.13, 543.15, 543.19, 543.23

[56] References Cited

U.S. PATENT DOCUMENTS

| 3,156,259 | 11/1964 | Havelka et al. |
| 3,618,776 | 11/1971 | Kudlaty . |
| 4,028,243 | 7/1977 | Offer et al. . |
| 4,279,746 | 7/1981 | Leutz . |
| 5,770,054 | 6/1998 | Ardes . |
| 5,971,016 | 11/1964 | Wass et al. . |

FOREIGN PATENT DOCUMENTS

| 4214500 A1 | 11/1983 | Germany . |
| 3904701 A1 | 8/1990 | Germany . |

OTHER PUBLICATIONS

Mann + Hummel Filtertechnik Brochure (undated).

*Primary Examiner*—W. L. Walker
*Assistant Examiner*—Terry K. Cecil
*Attorney, Agent, or Firm*—Roylance, Berdo & Goodman, L.L.P.

[57] ABSTRACT

A filter device has a bypass valve which releases a fluid-conveying path to an outlet when a filter element becomes clogged. The bypass valve includes a closure part on which at least one closure spring acts. To adjust the spring pretension and the opening force for the closure part, an adjusting device is provided for adjusting the opening force of the closure spring. The filter device can be economically adapted without any structural modifications to very different applications in a predetermined pressure range.

14 Claims, 6 Drawing Sheets

FILTER BYPASS VALVE HAVING ADJUSTABLE SPRING BIASING FORCE

FIELD OF THE INVENTION

The present invention relates to a filter device with a bypass valve. The bypass valve frees a fluid-conveying passage to an outlet when a filter element becomes clogged, and has a closing part operated by at least one breech-closing spring.

BACKGROUND OF THE INVENTION

Filter devices with bypass valves are known in a plurality of embodiments and sizes. Within the filter device is a hollow cylindrical filter element, which removes contaminants from contaminated liquid fed through an inlet in the filter device. The liquid is passed through the filter element generally from the outside inward. The filter mat of the filter element is supported along a support pipe provided with apertures. The filter liquid is then conveyed through an outlet out of the filter device for recycling for further use. The longer the filter element is in filtering operation, the more it is clogged by contaminants, until finally the filter element forms an almost impenetrable barrier for the flow of the fluid. The fluid can no longer reach the outlet end of the filter device. To avoid an interruption of the flow of the fluid, which can potentially result in an operational breakdown of an entire hydraulic system, a bypass valve is provided within the filter device. The bypass valve includes a spring-biased or pretensioned closing part. With increasing fluid pressure within the filter device, the closing parts opens a fluid-conveying passage directly from the inlet to the outlet, disconnecting the filter element. Such bypass valves consequently support operational reliability and avoid undesirable pressure peaks, which can also lead to damage within a hydraulic system.

Such a filter device with bypass valve is known from U.S. Pat. No. 4,279,746. This filter device is provided with a bypass valve. When the filter becomes clogged, it frees a fluid-conveying passage to an outlet. A closing part is present, acted on by a breech-closing spring. An adjusting device is provided for adjusting the spring pretensioning, and thus, the opening force for the closing part. As adjusting device, this patent employs an adjusting ring which can be moved along a holder rod for the step-by-step adjustment of the spring pretensioning, and can be fitted and locked with this member in predeterminable catch settings. A clip-spring servces as a catch which can be inserted in the catch openings of the holder rod and represents an end stop for the pretensioned adjusting ring. With this arrangement, the maintenance for the adjusting of the opening force for the closing part is difficult and complicated to perform.

DE-A-4 214 500 discloses a holding cage in the form of a support body, configured as hollow cylinder with notch cutouts. Within this holding cage is arranged a pretensioned closing part, which opens when a predeterminable desired pressure peak is reached, so that an ambient or high-pressure function is realized. Modification of the spring closing force and with that of the opening force for the closing part is not possible for all practical purposes following the assembly of the device for successful control of the ambient or high-pressure valve, since the adjusting ring is fitted and locked with its detent in the holder cage.

SUMMARY OF THE INVENTION

Objects of the present invention are to provide a filter device which can be adapted at low cost, without structural modifications, to a wide range of uses in a predeterminable pressure range, even with already supplied filter devices with modified operation with changed pressure ratios, without requiring complicated maintenance procedures.

The foregoing objects are basically attained by a filter device comprising a housing with a fluid path between an inlet and an outlet, a filter element located in the housing in the fluid path, and a bypass valve in the housing controlling a bypass passage for fluid flow between the inlet and the outlet that bypasses the filter element. The bypass valve includes a closing part movable between an open position allowing fluid flow through the bypass passage when the filter element becomes clogged and a closed position blocking fluid flow through the bypass passage and causing fluid flow in the housing through the filter element. At least one breech-closing spring applies an adjustable biasing force on the closing part toward the closed position and has opposite first and second spring ends. A holding cage has holding rods parallel to a cage longitudinal axis with catches on its free ends. An adjusting ring has recesses extending therethrough parallel to a ring longitudinal axis unobstructively receiving the holding rods of the holding cage, and has notch cutouts releasably and selectively engageable with the catches upon rotation of the adjusting ring. The cutouts are arranged at least in first and second groups with the cutouts of each group being in a single plane and the cutouts of the different groups being in different planes. The recesses have radial slots extending adjacent the cutouts though which the holding rods can extend to a permit the catches to move into the engagement with the cutouts by rotation of the adjusting ring.

By forming the filter device in this manner, the biasing force of the spring is adjusted in a step-by-step manner by axial movement of the adjusting ring along the holding rods toward and away from the closing part. The adjusting ring is releasably locked in an adjusted position by engagement of the catches in a selected one of the groups of cutouts. Thus, with a simple adjusting movement of the objecting ring, the length of the breech-closing spring can be modified, and consequently, the opening force for the closing part is adjusted to correspond to the fluid pressure of the system on which the filter device is used.

In one preferred embodiment of the filter device of the present invention, the breech-closing spring is held between the holding rods of the holding cage, and the breech-closing spring is supported with one unattached end on the adjusting ring and its other end on the closing part. The closing part is then guided along the holding rods from a closed position in the direction of operation or biasing of the breech-closing spring into an open position, and vice versa. The adjusting ring can surround the holding rods to counter a tendency of the holding cage to widen out in the area of the unobstructed or free ends of the holding rods, even when the spring pretensioning or forces prevailing between the adjusting ring and the closing part assumes very high valves.

In another preferred embodiment of the filter device of the present invention, the closing part is constructed hood-shaped and has cutouts on its external periphery diametrically opposite one another to receive the associated holding rods. The crowned configuration of the closing surface of the closing part can be brought into sealed contact with an annular contact surface of the holding cage. As a result of the direct guiding of the closing part along the holding rods engaging in the associated cutouts, the closing part cannot be tilted, and reliable guiding is attained. The impacting fluid provides beneficial introduction of the opening forces on the bypass valve because of the crowned configuration of the closing surface. Also, a linear force distribution occurs between the surfaces engaging on one another with strong sealing forces, so that the filter device is securely sealed when it is in a normal operational state.

In one preferred embodiment, the adjusting ring has at least one fitting and locking possibility for the holding rods on each of its opposite sides. One side serves to support the relevant breech-closing spring. In the resulting construction, the adjusting ring can be used for pressure adjustment dependent upon the pressure ratio to be set on both ends.

In one preferred embodiment of the filter device of the present invention, the holding cage defines a receiving chamber with cross piece parts at its end opposite the catches. The receiving chamber can receive a filter. The inserted filter, in an unobstructed bypass situation, provides a rough filtration, preventing the most coarse contaminant particles from passing through the opened bypass valve into the hydraulic circuit.

In one especially preferred embodiment of the filter device of the present invention, a holder ring is provided to receive and hold the filter element, and has a releasable connection with an annular flange of the holding cage. With such a configuration, a worn filter element can be exchanged for a new one, without requiring changing the bypass valve which must be cut out of operation at the same time. When the filter element is essentially of one piece with the bypass valve and they are connected together as one integral unit, both the filter element and the bypass valve must be changed. As a result of separate removal of the filter element through the associated holder ring, the recycling of the filter element is also simplified.

In another preferred embodiment of the filter device of the present invention, following removal of the bypass valve, the freed opening cross section in the device can be closed with a cover part which can be connected with the holding cage by means of the connection means of the holder ring. In terms of modular construction of the filter device, even without requiring structural modifications the filter device can be arranged and used without the bypass valve, when the user does not require a bypass valve, for example because fluid currents in all cases are to be filtered by means of a filter element before further feed into the hydraulic circuit.

Other objects, advantages and salient features of the present invention will become apparent from the following detailed description, which, taken in conjunction with the annexed drawings, disclose preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
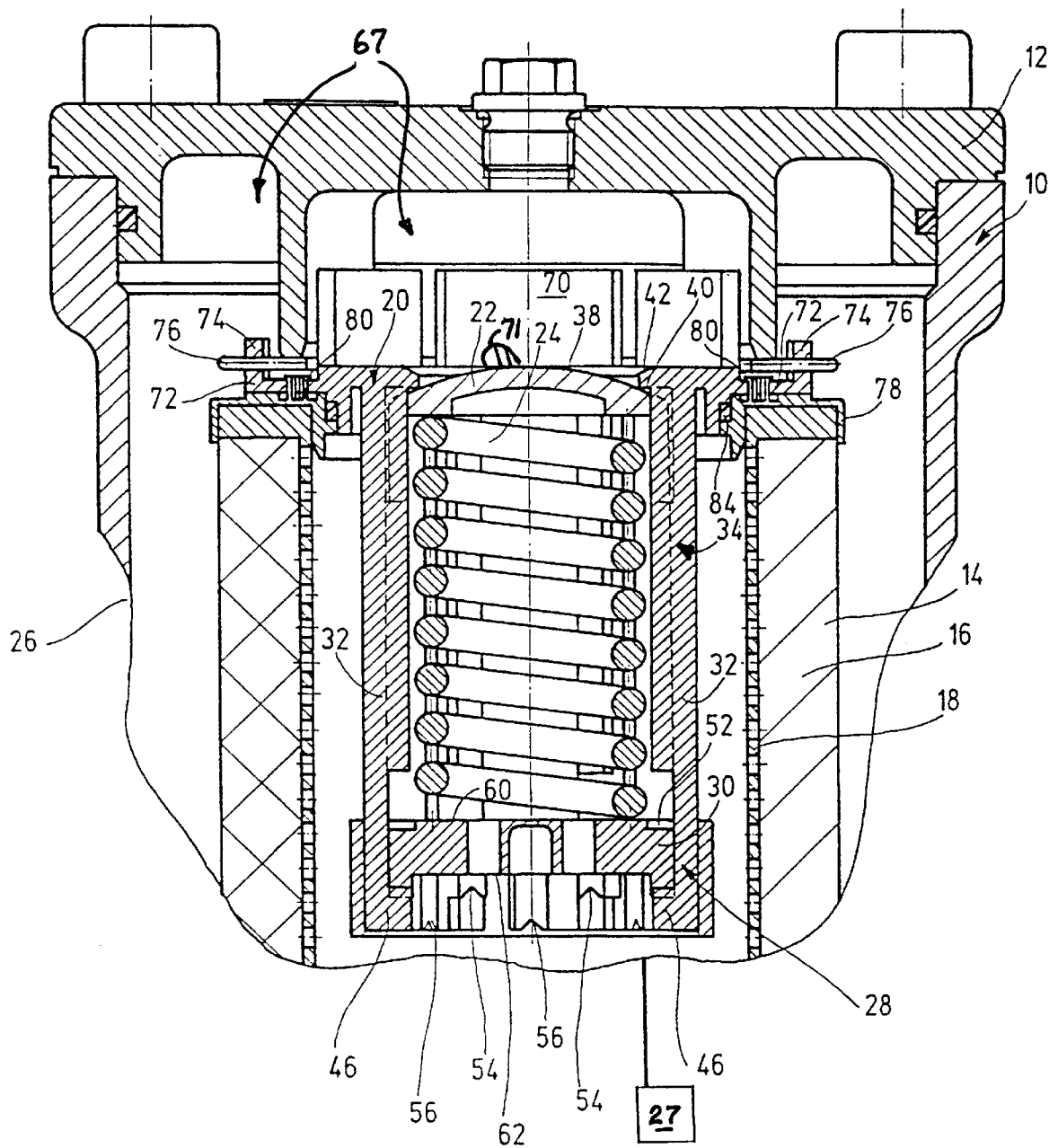
FIG. 1 a partial side elevational view in section of the top part of a filter device according to a first embodiment of the present invention, with a partial illustration of the filter element and including the bypass valve.

The top part of a filter device, according to the first embodiment, shown in FIG. 1 fits in a housing indicated in its entirety as 10. Housing 10 is connected with a cover 12 with a sealed connection by means of screw connections. A hollow cylindrical filter element 14 is arranged within the filter device. The filter element filter mat 16 is supported on a support tube 18 with apertures, with support tube 18 likewise being a hollow cylinder.

A bypass valve, indicated in its entirety as 20, is arranged within the filter device. The bypass valve has a closing part 22 acted upon by a breech-closing spring 24. Breech-closing spring 24 is a compression spring, as illustrated in FIG. 1, that holds closing part 22 in its closed position with a predeterminable closing force as a result of the pretensioning or prestressing of the spring.

Cylindrical breech-closing spring 24 is configured as a helical spring, and has a essentially linear spring characteristic behavior, but, for example, can also be configured conically and have a progressive characteristic behavior. Several spring elements could be arranged one behind the other or be connected in parallel, or one breech-closing spring could surround the periphery of another spring, in order to hold closing part 22 in its closed setting when not in operation.

An inlet 26 in housing 10 of the filter device is provided for the feed of the contaminated liquid. Filter element 14 has an outlet 27 on its bottom end, as oriented in FIG. 1, at the bottom of the filter housing 10 for discharge of the filtered liquid. Filter element 14 thus forms a filtering barrier between inlet 26 and outlet 27.

Figure 2:
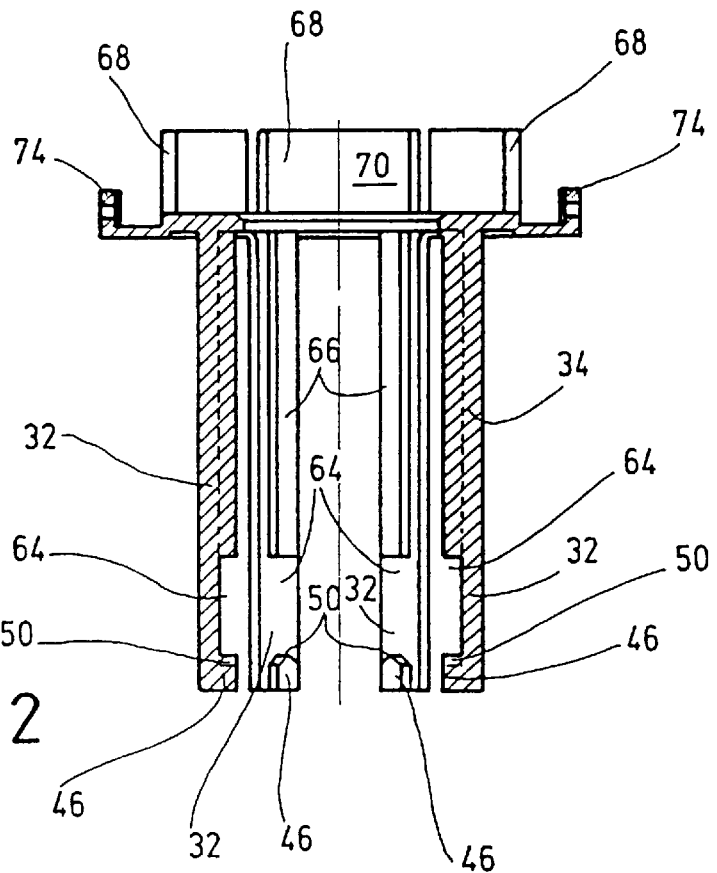
FIG. 2 is a side elevational view in section of the holding cage with holding rods of the filter device of FIG. 1.
Figure 3:
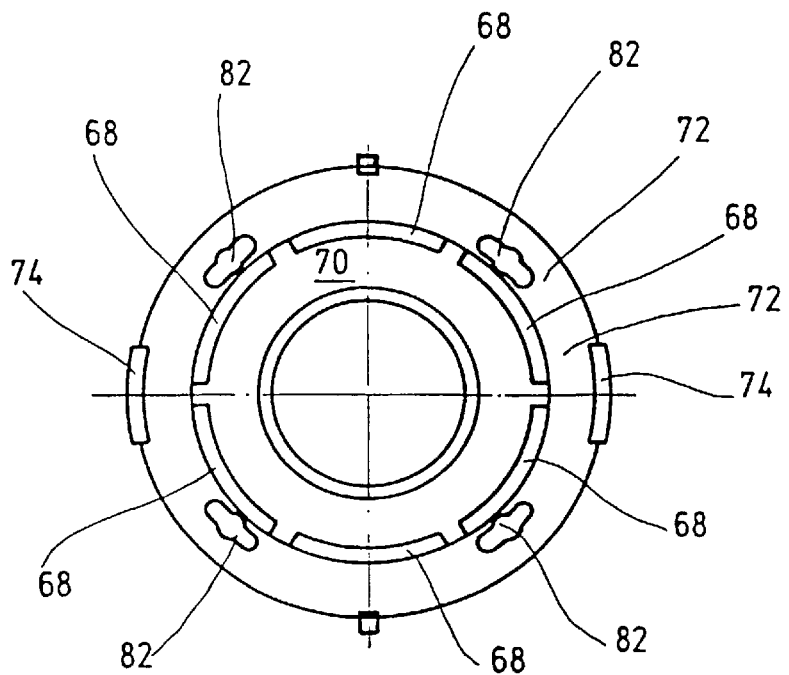
FIG. 3 is a top plan view of the holding cage of FIG. 2.
Figure 4:
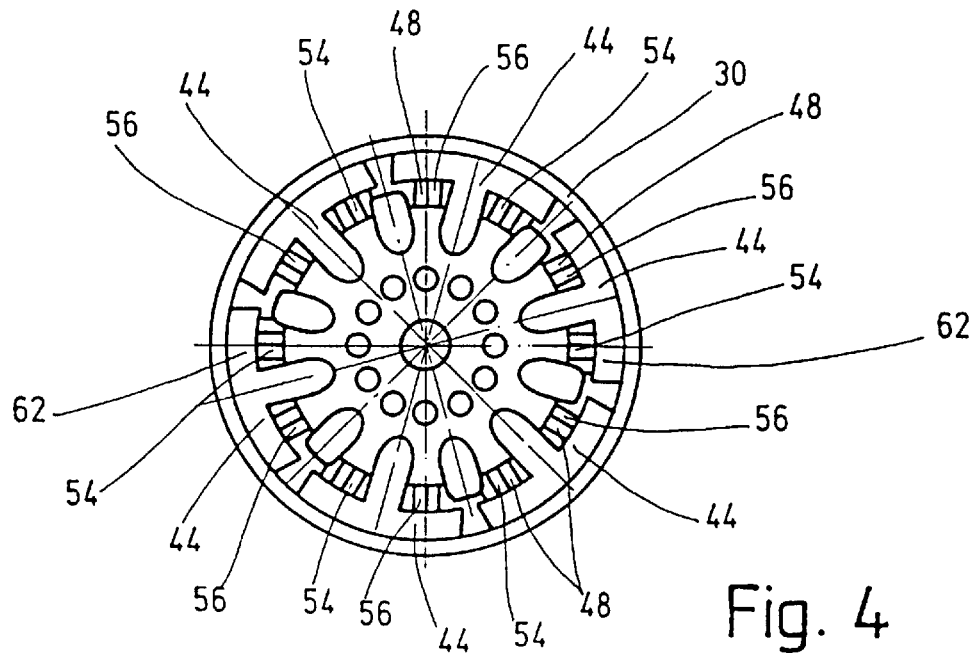
FIG. 4 is a bottom plan view of the adjusting ring of the filter device of FIG. 1.
Figure 5:
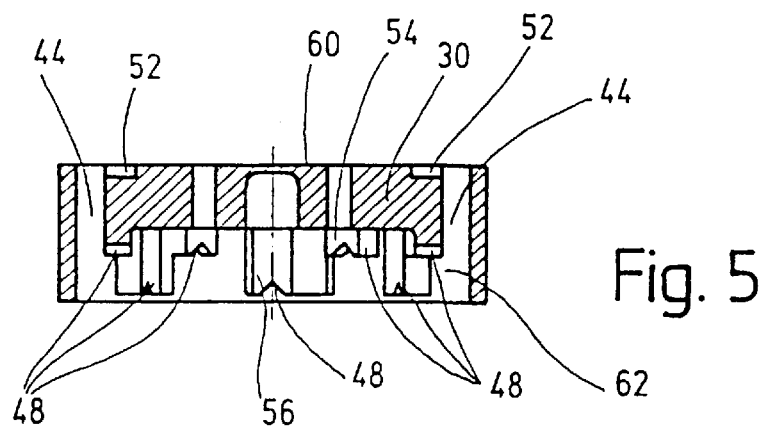
FIG. 5 is a side elevational view in section of the adjusting ring of FIG. 4.
Figure 6:
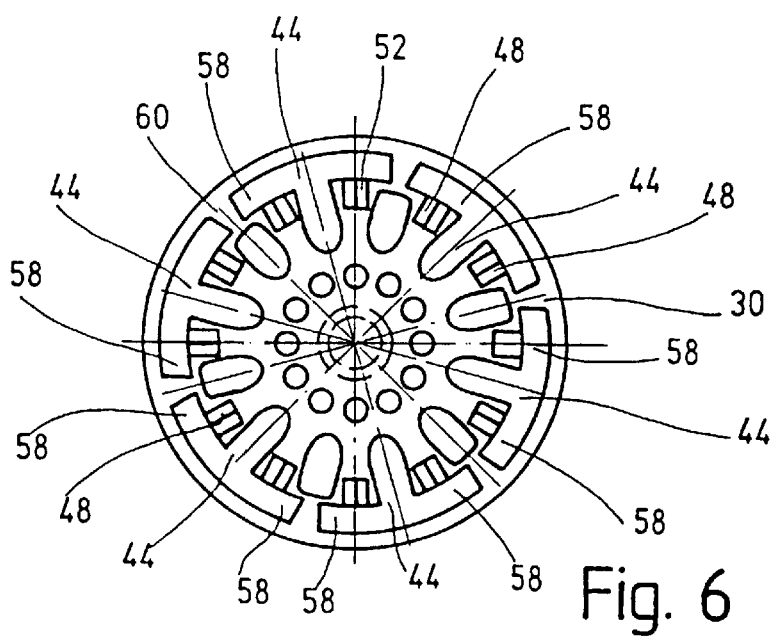
FIG. 6 is a top plan view of the adjusting ring of FIG. 4.

For the adjustment or setting of the spring pretensioning or prestressing and the opening force for closing part 22, an adjusting device, indicated in its entirety as 28, is provided which modifies the length of breech-closing spring 24. For step-by-step adjustment of the spring pretensioning, adjusting device 28 includes an adjusting ring 30, as is shown in greater detail in FIGS. 4 to 6. This adjusting ring 30 can be moved along by holding rods 32 of a holding cage 34, and can be locked together with holding cage 34 in predeterminable fitting and locking settings. Holding cage 34 with its holding rods 32, is represented in greater detail in FIGS. 2 and 3.

As shown in FIG. 1, breech-closing spring 24 is maintained at some distance between holding rods 32 of holding cage 34, whereby spring 24 is supported with its one free end on adjusting ring 30 and on its other free end of the bottom of closing part 22. Closing part 22 is guided along holding rods 32 from its closing setting, as shown in FIG. 1, counter to the bias of breech-closing spring 24 to its open setting and vice versa. The length of breech-closing spring 24 is determined, when bypass valve 20 is not in operation, by the degree of space between closing part 22 and the top of adjusting ring 30.

Figure 7:
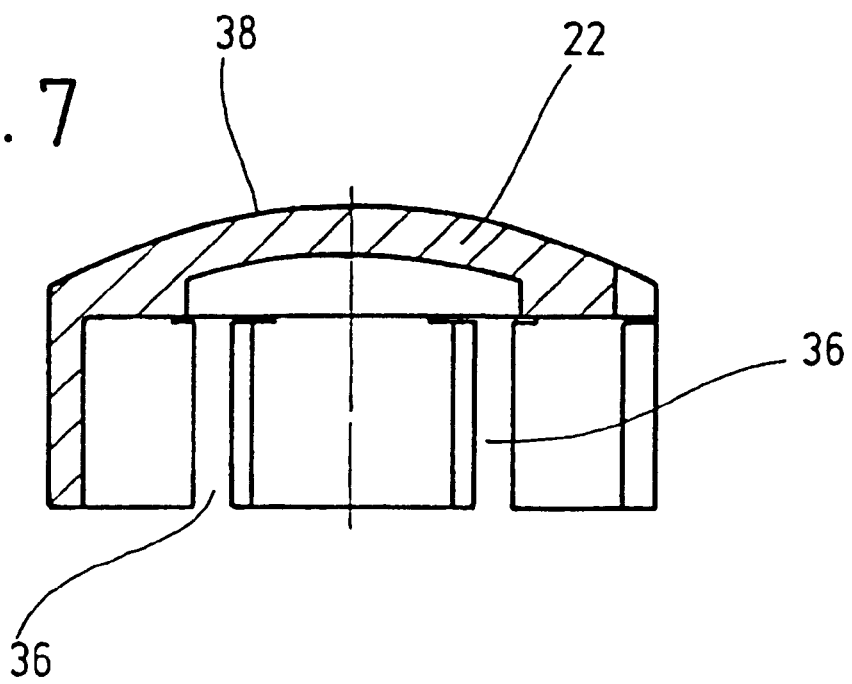
FIG. 7 is a side elevational view in section of the closing part of the filter device of FIG. 1.
Figure 8:
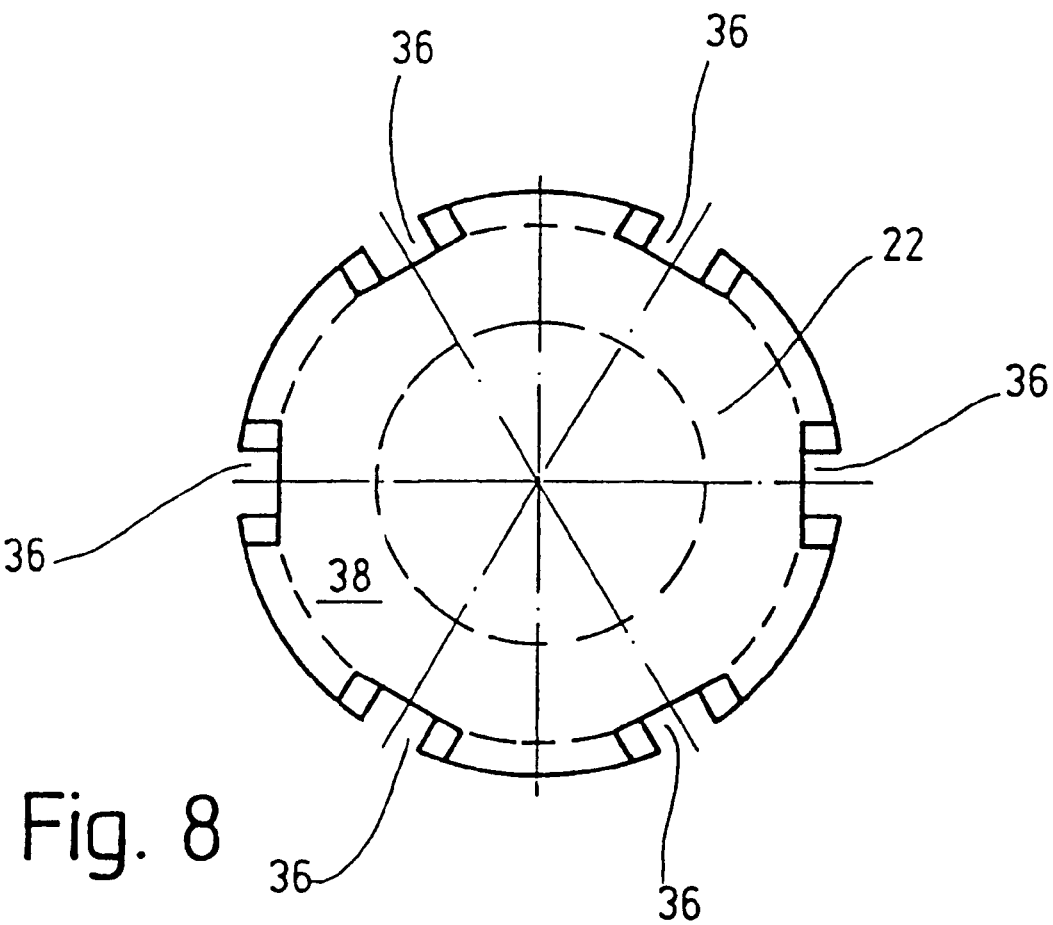
FIG. 8 a top view of the closing part of FIG. 7.

Closing part 22, as shown particularly in FIGS. 7 and 8, is constructed hood-like. On its exterior periphery, it has diametrically opposite cutouts 36 to receive the associated holding rods 32. The crowned closing surface 38 of closing part 22 can be brought into sealed alignment with an annular contact surface 40 of holding cage 34. Annular contact surface 40 of holding cage 34 is arranged on the bottom of an annular projection, and is aligned in sealed contact with closing surface 38 of closing part 22 along a closed annular line 42.

Adjusting ring 30 has recesses or cutouts 44 passing all the way through for unobstructed engagement of the six T-shaped holding rods 32, having catches 46 on their free ends turned inward. By rotation of adjusting ring 30, rods 32 can be brought into engagement with notched cutouts 48 of adjusting ring 30, as explained in greater detail hereinafter. Catches 46 of holding cage 34 have roof-shaped or tapered projections 50 on their ends remote from the free ends of holding rods 32. Projections 50 engage in correspondingly configured and consequently likewise roof-shaped or tapered notched cutouts 48 of adjusting ring 30 for fitting and locking.

As shown particularly in FIGS. 1 and 4–6, notched cutouts 48 are arranged in three sets forming fitting and locking or catch points in three groups 52, 54 and 56, arranged in three different horizontal planes of adjusting ring 30. Cutouts 44 have radial slots 58 on both sides, such that dependent upon the direction of rotation (left or right) of adjusting ring 30, cage projections 50 can selectively engage or catch on group 52, 54 or 56 at notched cutouts 48. Top 60 (FIG. 6) of the adjusting ring 30 has the first group 52 of roof-like notched cutouts 48. These notched cutouts 48 of first group 52 are arranged diametrically opposite one another with each cutout opening into the relevant radial slot 58. Notched cutouts 48 of first group 52 are arranged in a horizontal plane to the right and left of the associated cutouts 44. Since twice as many notched cutouts 48 in one plane are present in first group 52, catch devices or catches 46 on holding rods 32 can engage cutouts 48 of the first group independent of the direction of rotation of adjusting ring 30 to the left or to the right relative to the associated holding rod 32. On the bottom 62 (FIG. 4), opposite top 60, of adjusting ring 30 two more groups 54 and 56 are provided with fitting and locking possibilities. The associated notched cutouts 48 of each group are each arranged to provide different effective length for the holding or support rods. Dependent upon the axial adjustment movement of adjusting ring 30 along holding rods 32 of holding cage 34 and dependent upon the direction of rotation of adjusting ring 30, then, catch devices 46 come to catch or engage in the one group 54 or in the other group 56 and consequently selectively determine the predeterminable length of breech-closing spring 24.

For the rotation and subsequent axial movement of the adjusting ring 30 in the area of the bottom end of holding rods 32, the relevant catches are spaced the same distance 64 from the projecting parts 66 of holding cage 34. The spacing 64 is adapted to correspond to the level of adjusting ring 30 in use. Cutouts 44 of adjusting ring 30 have a cutout width transverse to the radial slots 58 allowing the free ends of holding rods 34 with their catch devices 46 to pass through these cutouts 44 to control the thrusting of adjusting ring 30 on holding cage 34.

In FIG. 1, the inwardly projecting catches 46 are in contact, by means of the free ends of holding rods 32, with the second group 54 of the notched cutouts 48 on bottom 62 of adjusting ring 30. The length of breech-closing spring 24 is consequently determined by the space between closing part 22 and adjusting ring 30 which is thus predetermined. If adjusting ring 30 is thrust upward, in the direction of view of FIG. 1, until it reaches the level of the third group 56 of notched cutouts 48, following rotation of adjusting ring 30 in the other direction and under engagement of holding rods 32 in the opposite radial slots 58 of cutouts 44, another fitting and locking possibility is provided. In this other position, the length of breech-closing spring 24 is shortened by the amount of vertical space between the two groups 54 and 56, resulting in remarkably higher closing force in exerted on closing part 22.

After complete withdrawal of adjusting ring 30 from holding cage 34 and rotation or inversion of adjusting ring 30 about a horizontal axis, catch 46 can engage in the first group 52 of notched cutouts 48 on the top 60 of adjusting ring 30. Such engagement allows the spring to extend to its greatest length, and correspondingly, the closing force of breech-closing spring 24 is decreased on closing part 22. If necessary, adjusting ring 30 can have fewer or more groups of fitting and locking possibilities, not shown, on either top 60 or bottom, 62 but still only on one end. With the indicated three groups of locking possibilities, three opening pressures can be set, for example 1, 3 and 6 bar pressure. The 1 bar can be set with the first group 52. The 3 bar can be set with the second group 54. The 6 bar can be set with the third group 56 of notched cutouts 48 of adjusting ring 30. By adjusting the opening pressure commensurate with associated filter element 14 in this manner, the fluid current opens bypass valve 20, by pressing closing part 22 downwardly in the direction of FIG. 1. The contaminated fluid current then passes directly from inlet 26 to the outlet side of the filter device through a bypass fluid conveying passage 67, without passing through the filter mat.

At its end opposite catches 46, holding cage 34 has segmented crosspiece parts 68, arranged at some distance from the catches. The crosspiece parts define an annular or circular receiving space 70 which receives a filter 71. Such filter can have a filter mat. In a bypass operation, the contaminated fluid current is freed by the filter in space 70 at least of coarse contaminants, before the fluid flows to the outlet side of the filter device and is fed to the hydraulic circuit. Along the top crosspiece parts 68, bypass valve 20 is held in its setting by means of top housing cover 12, as shown in FIG. 1, within the filter device. Radial segments of the top housing cover 12 of the filter device at least partially surround the crosspiece parts 68 and fix the position in radial alignment. The bottom cap element seals over a radial gasket by means of O-rings.

An annular flange 72 has two shaped attachments 74 for removal of bypass valve 20 from filter device 10. A wire strap 76 engages attachments 74, and can be raised up following removal of housing cover 12 from the filter device (cf. FIG. 9). A holding ring 78 is provided to hold filter element 14. Holding ring 76 surrounds the top end and is connected securely with the filter element 14. For a detachable connection, holding ring 78 has connecting means 80 on its side facing toward annular flange 72, for example in the form of projecting click catches. Such catches are distributed uniformly around the exterior periphery and engage in associated radial recesses 82 distributed around the circumference of flange 72. Following rotation of holder ring 78 in either direction, the holder ring is secured on flange 72. With the rotation in the opposite direction, the securing arrangement can also include flange 72 and connecting means 80, which then engage in holding ring 78 holding filter element 14.

With the proposed arrangement it is possible to detach filter element 14 from bypass valve 20, for example for recycling. Associated holder ring 78 and bypass valve 20 and filter element 14 consequently can form a totally exchangeable or replaceable modular unit. To attain secure sealing between holding ring 78 and flange 72, a sealing gasket 84 is arranged between the associated contact surface of the ring and the flange.

Figure 9:
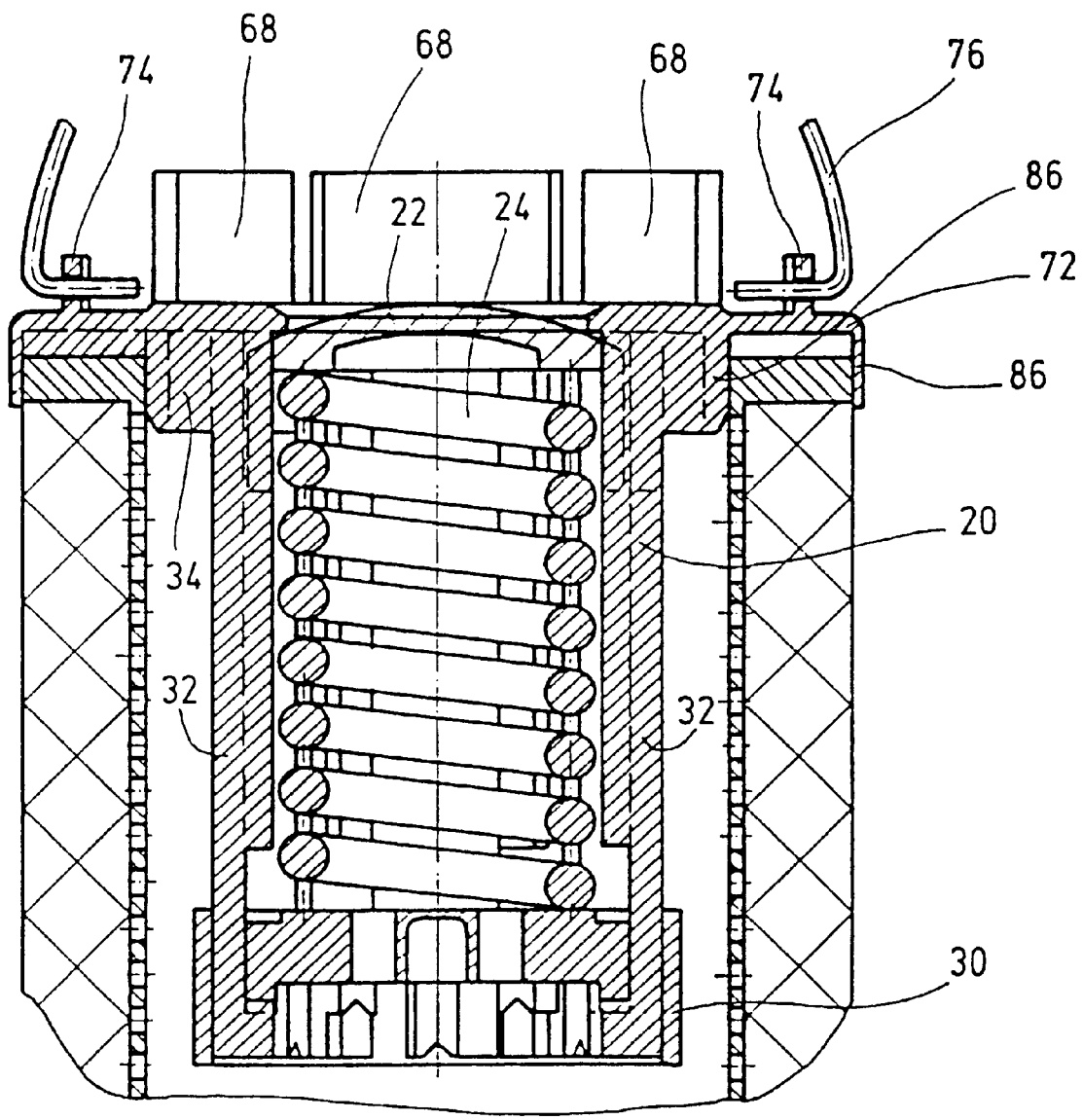
FIG. 9 is a partial side elevational view in section of the top part of a filter device according to a second embodiment of the present invention having a bypass valve with non-replaceable filter components.

In the embodiment shown in FIG. 9, exchange of the bypass valve and filter element as a modular unit is not provided. Filter element 14 is essentially integrally formed as one piece with annular flange 72, and thus, is also connected with bypass valve 20. Annular flange 72 has downwardly inclined annular surfaces 86 for the securing of filter element 14. FIG. 9 also shows wire strap 76 raised for insertion or removal of filter element 14, with bypass valve 20 fitted in or removed from the filter device.

Figure 10:
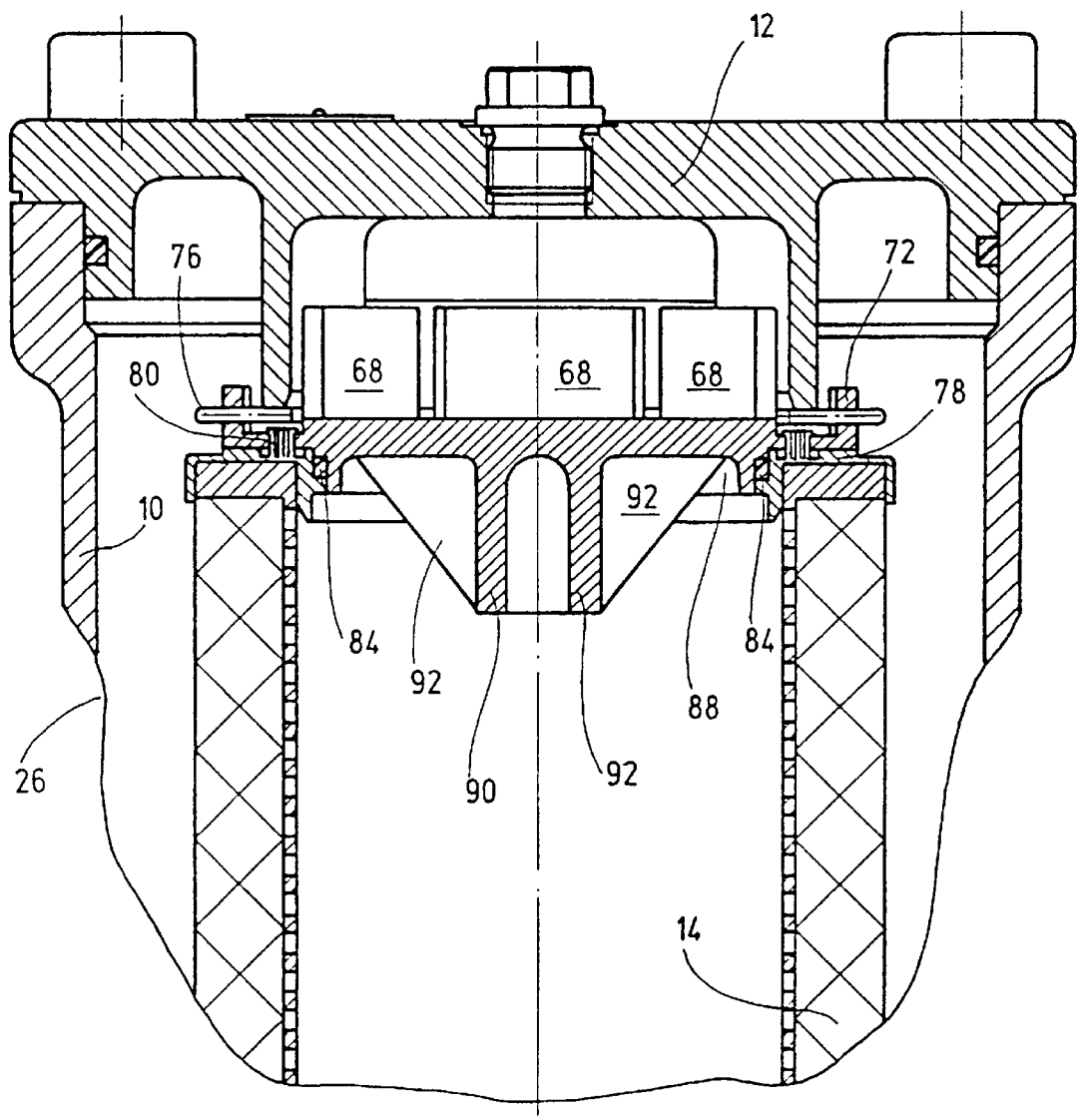
FIG. 10 is a partial side elevational view in section of the top part of a filter device according to a third embodiment of the present invention, with an inserted cover part instead of the bypass valve.

In the embodiment of FIG. 10, bypass valve 20 of the first embodiment is removed from the filter device, and the open cross section 88 is closed by a cover part 90. Cover part 90 can be connected over this opening by means of the aforementioned connection means 80 of holding ring 78. A seal between cover part 90 and holding ring 78 is again provided by means of a sealing gasket 84. Cover part 90 has partial ribs 92 on its bottom as shown in FIG. 10, arranged in a star-shaped layout. The ribs taper conically toward the inside of filter element 14. The crosspiece construction on top of cover part 90 corresponds to the construction of crosspiece parts 68 of holding cage 34 to secure cover part 90 within the filter device without other structural modification. When use of bypass valve is not required, the valve can be replaced by the cover part 90 as shown in FIG. 10. Since the embodiments of FIGS. 9 and 10 are based extensively on the first embodiment shown in the proceeding drawings, the same reference numbers are used to describe the same features of the embodiments shown in FIGS. 9 and 10. The corresponding descriptions of the first embodiment features also apply to the second and third embodiments.

It is especially advantageous to manufacture bypass valve 20, with the exception of breech-closing spring 24, of injection-molded plastic. This manufacture leads to easier construction and to cost savings. Also, as shown especially in FIGS. 4 to 6, adjusting ring 30 can have more cutouts to attain weight reduction.

While various embodiments have been chosen to illustrate the invention, it will be understood by those skilled in the art that various changes and modifications can be made therein without departing from the scope of the invention as defined in the appended claims.

What is claimed is:

1. A filter device, comprising:

a housing with an inlet, an outlet and a fluid path between said inlet and said outlet;

a filter element located in said housing in said fluid path;

a bypass valve in said housing controlling a bypass passage for fluid flow between said inlet and said outlet that bypasses said filter element, said bypass valve including a closing part movable between an open position allowing fluid flow through said bypass passage when said filter element becomes clogged and a closed position blocking fluid flow through said bypass passage and causing fluid flow in said housing through said filter element;

at least one breech-closing spring applying an adjustable biasing force on said closing part toward said closed position and having opposite first and second spring ends;

a holding cage having holding rods parallel to a cage longitudinal axis and having catches on free ends thereof; and an adjusting ring having recesses extending therethrough parallel to a ring longitudinal axis unobstructively receiving said holding rods of said holding cage and having notch cutouts releasably and selectively engageable with said catches upon rotation of said adjusting ring, said cutouts being arranged in at least first and second groups with the cutouts of each group being in a single plane and the cutouts of the different groups being in different planes, said recesses having radial slots extending adjacent said cutouts through which said holding rods can extend to permit said catches to move into engagement with said cutouts by rotation of said adjusting ring;

whereby, said biasing force of said spring is adjusted in a step-by-step manner by axial movement of said adjusting ring along said holding rods toward and away from said closing part, and said adjusting ring is releasably locked in an adjusted position by engagement of said catches in a selected one of said groups of said cutouts.

2. A filter device according to claim 1 wherein said spring is held between said holding rods of said holding cage with said first spring end on said adjusting ring and said second spring on said closing part.

3. A filter device according to claim 2 wherein said holding cage has an annular contact surface;

said closing part comprises a hood-like portion with closing part cutouts arranged on an exterior periphery of said closing part and diametrically opposite one another, said closing part cutouts receiving said holding rods; and said hood-like portion has a crown shaped closing surface releasably sealed with said annular contact surface of said holding cage.

4. A filter device according to claim 1 wherein said adjusting ring has opposite first and second ring ends, at least one of said ring ends supporting said spring, each of said ring ends having at least one of said groups of said cutouts.

5. A filter device according to claim 4 wherein said holding cage comprises a receiving space with bar members at an end of said holding cage remote from said catches, said receiving space receiving a filter.

6. A filter device according to claim 5 wherein a holding ring receives and detachably connects said filter element with an annular flange on said holding cage.

7. A filter device according to claim 1 wherein said adjusting ring comprises a third group of said cutouts arranged in a plane different from said planes of said first and second groups.

8. A filter device according to claim 7 wherein said adjusting ring has opposite first and second ring ends, said first and second groups being on said first ring end, and said third group being on said second ring end.

9. A filter device according to claim 1 wherein said catches extend radially relative to said cage longitudinal axis;

said cutouts extend radially relative to said ring longitudinal axis; and said longitudinal axes are colinear.

10. A filter device according to claim 9 wherein
said catches and said cutouts having mating portions tapered in same directions parallel to said axes.

11. A filter device according to claim 9 wherein
said catches extend radially inwardly from said holding rods.

12. A filter device according to claim 11 wherein
said cutouts extend radially inwardly from said radial slots.

13. A filter element according to claim 9 wherein said adjusting ring has first and second opposite ring ends; and said first and second groups are on said first ring end at angularly spaced locations relative to said ring longitudinal axis.

14. A filter element according to claim 1 wherein said adjusting ring surrounds said holding rods.

* * * * *